(12) United States Patent
Bouguerra et al.

(10) Patent No.: US 12,223,039 B2
(45) Date of Patent: Feb. 11, 2025

(54) METHODS AND SYSTEMS USING AN AI CO-PROCESSOR TO DETECT ANOMALIES CAUSED BY MALWARE IN STORAGE DEVICES

(71) Applicant: Flexxon Pte Ltd, Singapore (SG)

(72) Inventors: Nizar Bouguerra, Singapore (SG); Chan Mei Ling, Singapore (SG)

(73) Assignee: FLEXXON PTE LTD, Singapore (SG)

( * ) Notice: Subject to any disclaimer, the term of this patent is extended or adjusted under 35 U.S.C. 154(b) by 655 days.

(21) Appl. No.: 16/882,418

(22) Filed: May 22, 2020

(65) Prior Publication Data

US 2021/0064745 A1    Mar. 4, 2021

Related U.S. Application Data

(60) Provisional application No. 62/893,207, filed on Aug. 29, 2019.

(30) Foreign Application Priority Data

Aug. 29, 2019  (SG) ............... 10201907989W
May 22, 2020  (SG) ............... 10202004811X (51) Int. Cl.
  *G06F 21/55*   (2013.01)
  *G06N 3/063*   (2023.01)
  (Continued)

(52) U.S. Cl.
  CPC .......... *G06F 21/554* (2013.01); *G06N 3/063* (2013.01); *G06N 5/04* (2013.01); *G06N 20/00* (2019.01); *G06F 2221/034* (2013.01)

(58) Field of Classification Search
  None
  See application file for complete search history.

(56) References Cited

U.S. PATENT DOCUMENTS 11,201,641 B2 *  12/2021  Shake ................ H04B 7/0426
11,244,050 B2 *  2/2022   Nataraj .............. G06N 20/00
(Continued)

FOREIGN PATENT DOCUMENTS

KR   2012-0073018   *  7/2012
KR   10-1893519     *  9/2018
(Continued)

OTHER PUBLICATIONS

Sayakkara et al., "A survey of electromagnetic side-channel attacks and discussion on their case-progressing potential for digital forensics", Science Direct, Digital Investigation vol. 29, Jun. 2019, pp. 43-54.*

(Continued)

*Primary Examiner* — Piotr Poltorak
(74) *Attorney, Agent, or Firm* — Evergreen Valley Law Group; Kanika Radhakrishnan (57) ABSTRACT

Computer implemented systems and methods for performing electromotive force analysis of a storage device that include a storage device, an Artificial Intelligence Co-processor (AI-Coprocessor) chipset, a thin coil inductor positioned in proximity to a portion of the surface of the storage device for capturing data from electro motive radia generated by the storage device, an analog-to-digital-converter, and at least one probe for communicating the captured data to an analog-to-digital converter. The data is captured by the thin coil inductor and communicated to the analog-to-digital-converter via the at least one probe and the analog-to-digital-converter digitizes the voltage level of the captured data and communicates the results of the digitization and amplification to the Ai-Coprocessor. The Ai-Coprocessor chipset performs analysis of the data to detect any anomalies in the operation of the storage device and outputs those result for further processing. Embodiments include the (Continued)

use of an NVM Express protocol or an AHCI controller engine so it can detect in real time any hardware threats or attacks such as side channel attack, power glitch and any other hardware changes. Embodiments can detect malicious activities such as ransomware, virus and malware, or non-malicious activities by measuring the electromotive force energy caused by anomalous activities.

20 Claims, 6 Drawing Sheets

(51) Int. Cl.
*G06N 5/04* (2023.01)
*G06N 20/00* (2019.01)

(56) References Cited

U.S. PATENT DOCUMENTS

| | | | | |
|---|---|---|---|---|
| 11,314,857 | B2* | 4/2022 | Reedman | G06F 1/28 |
| 11,328,062 | B2* | 5/2022 | Canedo | G06F 21/554 |
| 2015/0358337 | A1* | 12/2015 | Keller | H04W 12/128 |
| | | | | 726/23 |
| 2016/0098561 | A1* | 4/2016 | Keller | G06F 21/566 |
| | | | | 726/24 |
| 2016/0371485 | A1* | 12/2016 | Onabajo | G06F 21/552 |
| 2017/0046300 | A1* | 2/2017 | Klein | G06F 13/1668 |
| 2018/0253386 | A1* | 9/2018 | Qiu | G06F 13/1668 |
| 2020/0104497 | A1* | 4/2020 | Crouch | G06F 21/76 |
| 2020/0159605 | A1* | 5/2020 | Shimada | G06F 11/0763 |

FOREIGN PATENT DOCUMENTS

| | | | | |
|---|---|---|---|---|
| WO | WO-2006028558 A1 * | 3/2006 | | G06F 21/55 |
| WO | WO-2018052446 A1 * | 3/2018 | | G06F 21/554 |
| WO | WO-2018104929 A1 * | 6/2018 | | G05B 19/042 |

OTHER PUBLICATIONS

Wrodpress, "Featured Electromagnetic Fields & EMF Detectors", found at https://anomaliesresearchsociety.wordpress.com/2017/10/11/electromagnetic-fields-emf-detectors-script/, author unknown, Oct. 2017.*

* cited by examiner

METHODS AND SYSTEMS USING AN AI CO-PROCESSOR TO DETECT ANOMALIES CAUSED BY MALWARE IN STORAGE DEVICES

CROSS-REFERENCES TO RELATED PATENT APPLICATIONS

The present application claims benefit of U.S. Provisional Application No. 62/893,207 filed on Aug. 29, 2019, Singapore Patent Application No: 10201907989W filed on 29 Aug. 2019, and Singapore Patent Application No. 10202004811X filed on 22 May 2020, each of which are herein incorporated by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND

Embodiments of the inventive subject matter relate to systems, apparatuses and methods for detecting anomalies in storage devices such as a Solid State Drive (SSD) and more specifically for independently detecting malware attacks using hardware and software.

A common problem with a SSD is keeping stored data safe and secured from any type of malware attacks such as ransomware attacks while at the same time monitoring the security of the SSD in real time. Ransomware and other malware threats and attacks have been increasing over time becoming more and more complex in nature and thus more difficult to detect and neutralize requiring more hardware and software resources on the part of the system user or manager as well as frequent updates.

Examples of prior art relating to artificial intelligence detection methods of threats or anomalous activities such as ransomware, viruses and malware include firmware, software or hardware based solutions. In some of these prior art examples, the firmware or software solution is located within the solid state drive controller chipset in line with the original firmware and the elements are dependent on the solid state drive controller chipset resources. These types of prior art configurations can cause time latency in operation due the delays from threat analysis activities. In these prior art examples, memory resources can easily be overloaded in cases where there is insufficient memory storage (RAM) capacity or an overload of CPU usage, power and current may also occur. These issues can cause leaks of information with specific types of attacks such as side channel or DPA attacks.

Further, the prior art often has issues with firmware portability as the firmware in a device needs to be updated when the solid state drive microcontroller architecture changes. These updates may require human intervention which can also lead to an increase in the frequency of system flaws. Additionally, firmware or software integration failing at these points could cause the whole solid state drive to become nonfunctional. In some examples using hardware solutions, the prior art involves tampering detection, detecting counterfeit hardware and unauthorized firmware, detection of types of software and firmware that may degrade the functionality of the device. In some prior art hardware solutions, the methods used focus on functionality that resides in the integrated circuit flash memory that don't check the integrity of the stored data in the solid state drive NAND flash. Additionally, this type of prior art monitors data without the use or integration of artificial intelligence.

Additionally, the prior art methods for detecting ransomware attacks in solid state drives using NVM Express protocol or/AHCI. Many also utilize firmware or software based solutions that require human intervention for code updates from architecture to architecture. The prior art also has delays in the processing of information related to SSD controller chipset resources such as RAM, DMA, and flash memory as more instructions are executed.

SUMMARY

The illustrative embodiments provide computer implemented methods, apparatuses, and systems that utilize state of art technology to detect ransomware attack or/threats or/activities that target Solid State Drive (SSD) storage devices by applying an Artificial Intelligence Co-processor (AI-Coprocessor) to monitor the Input and/or Output of NVM Express protocol or AHCI commands of the Solid State Drive controller chipset, in linear by measuring the electromotive force energy caused by solid state driver during the execution of NVM Express protocol or AHCI commands. As the integrity of data become vital, embodiments of the claimed subject matter allow users and administrators an extra layer of security against ransomware threats or attacks which can be difficult to detect by a conventional security tools.

Many of the described embodiments include a flexible printed circuit board, a rigid Flex printed circuit board and/or a rigid printed circuit board. Further, many of these boards have a low profile thickness. The present embodiments allow scalability to be integrated with any existing Solid State Drive format.

The embodiments also include the use of an ASIC, a FPGA and/or an embedded FPGA with passive components and/or active components populated in single printed circuit board for system integration. Embodiments also integrate ASIC, FPGA and/or embedded FPGA with a solid state driver chipset or, in some embodiments, the components can be placed between the solid state drive printed circuit board and a protection cover. In other embodiments, components may be positioned as an overlay printed circuit board using the same or similar profile of the targeted solid state drive printed board layout. In some of these embodiments, a small induction or/inductance can be placed on the top of or next to the solid state drive integrated circuit so that the embodiment is connected directly to the circuit via a connector or/thru-hole soldered in the printed circuit board of the AI-Coprocessor.

In many of these embodiments, the AI-Coprocessor is programmed to have self-training or self-learning mode. During the self-training or self-learning mode, the solid state driver device can execute a series of predefined NVM Express protocols and/or AHCI commands over a specified time of period. During this execution, the AI-Coprocessor receives the data flow from solid state drive device through a secure communication bus such a I2C protocol, a SPI protocol, a USB, an LVDS and/or any specified protocol defined by the user or predefined at the factory. In these embodiments, the AI-Coprocessor uses an external or/internal Analog-to-Digital Converter with a high resolution bits to measure the electromotive force energy generated by the solid state driver controller chipset in linear mode for generating one or more signature patterns that are presented in series of binary or hex codes. These codes may then be saved, for instance inside one or more AI-Coprocessor secure flash storage elements. In these embodiments, the generated patterns may have a rich value as well as a lean value and these values can be used as thresholds limits for any anomalous threats, attacks and/or activities such as those caused by malware or ransomware.

Embodiments can also provide convolution layers of algorithm modules embedded inside the AI-Coprocessor to enable the embodiment with the ability to train itself without utilizing a external deep learning model while still enabling real time monitoring of the integrity of stored data.

Many of the embodiments operate by interfacing or placing a dedicated hardware AI-Coprocessor which leads to an increase in the performance of the device, reliability of the security, and a reduction in the time latency by eliminating the target solid state driver RAM from overflow using independent resources including hardware such as flash memory and other types of memory such as RAM. Some embodiments operate in a failsafe mode by using ultra lower power voltage.

Many embodiments are linked to or in communication with the target solid state drive controller via a secured connections bus. Some embodiments use a smart algorithm for early detection of a threat attack such as a malware or ransomware attack before the attack is able to spread. The embodiments herein can used with a number of different integrated circuit packages, for example embodiments can be integrated with any solid state drive controller architecture without needing firmware updates or synchronization with the target solid state drive controller.

Many of the present embodiments allow for a significant reduction in the time to market while at the same time providing a reliable method to monitor the integrity of data and related operations of associated devices that relate to firmware and controller methods integrated with one or more solid state drives. In an exemplary attack, a ransomware attack executes one or more sequences of NVMe or AHCI commands using the host system top level outside of the firmware of the target solid state driver integrated circuit flash. In response, an embodiment will sample or measure the electromotive force energy generated by ransomware activities and operations through the solid state drive using the NVMe protocol or the AHCI protocol. During the attack activity period, the ransomware attack includes harmful sequences of NVMe/or AHCI commands that results in the target solid state driver integrated circuit generating a series of electromotive force signatures which are unique from other threats.

BRIEF DESCRIPTION OF THE DRAWINGS

Embodiments of the claimed subject matter present invention will are described by way of example with reference to the accompanying drawings, wherein:

DETAILED DESCRIPTION OF THE EMBODIMENTS

According to embodiments of the claimed subject matter, various apparatuses, systems and methods systems for detecting malware including attacks by malware including ransomware.

Embodiments can be used to protect data stored inside storage using artificial intelligence by sampling electromotive force caused by current flow for anomalies which indicate possible malware or other threats. Anomalies include variations in input/output activities of a storage device such as those found during the access of logical block addresses by ransomware.

In many of the current embodiments, an AI-Coprocessor is interfaced or positioned in proximity to a solid state drive controller chip-set using NVM Express protocol or AHCI. In several embodiments, the AI-Coprocessor can be placed with or inline or on top side of solid state drive controller chip. In some embodiments, the AI-Coprocessor is embedded in a custom made ASIC, an embedded FPGA or a SoC+FPGA as a single core or multi-cores.

These embodiments will run independently from the solid state drive controller chip-set resources detecting ransomware attacks in real time. In one use example, each of many threats or attacks have their own electromotive force (EMF) pattern signature, and these signatures are used for further analysis and comparison to one or more solid state drive controller chip-set electromotive forces (EMF) in normal operations.

Many of the described embodiments provide a user friendly solution to integrate the embodiments with an existing solid state drive controller integrated circuit board, with a standard communication bus that allows scalability with any type of Solid State Drive using NVM Express protocol and/or AHCI. The malware detection feature is based in the AI-Coprocessor which has a dedicated bus communication link with solid state drive controller integrated circuit via a defined secure protocol. All NVMe sequences, including admin sequences commands and user sequences commands, can be shared in real time with the AI-Coprocessor. The AI-Coprocessor will measure the electromotive force (EMF) that is generated by the integrated circuit of the solid state drive chipset, in conjunction with any NVMe, any AHCI Sequences, any NVMe, or any AHCI streams received, in any normal operations condition as well as during malware (including ransomware) attacks.

One advantage of many of the embodiments is a real time analysis with time latency minimization that can be helpful for use with Cloud Storage Server Applications or High Platform Servers applications. Many of these embodiments allow for early malware/ransomware detection that aids with the elimination of false detection numbers leading to a higher accuracy rate for detecting threats and attacks from malware including ransomware.

In many of the embodiments, the electromotive force energy measured is converted to a digital signal using an analog digital controller, and then resulting signals are computed or converted by different signals convolutions algorithms in line with time series analysis and/or compared against a large number of stored threat patterns, malware patters, and/or ransomware patterns. The number of patterns used for comparisons can be into the millions. Other embodiments use one or more self-training modules (within or external to the AI-Coprocessor) that run during the normal operations of the Solid State Driver Controller to make comparisons of any number and types of suitable patterns.

In many of these embodiments used to detect ransomware, when the time criteria of a ransomware score, a threshold, or a correlation coefficient reach the predetermined or real time determined level of ransomware threats, the AI-Coprocessor will trigger the alarm through General Purpose Input/Output Bus to alert the solid state drive controller to take further precautions and execute one or more corresponding configurations. Many of these embodiments operate independently from the solid state drive power source and they include dedicated internal RAMs, Flash memory and one or more communications peripherals. Other embodiments may have different configurations of components. Embodiments can take the format of any conventional ASIC solutions package including but not limited to a BGA, a CSP or as a bitstream file to operate from any FPGA and/or any embedded FPGA. The preferred embodiment is campaigned with external integrated circuit to measure or capture electromotive force energy and with passive and active components.

The present embodiments are not limited to unique configurations to detect threats and attacks from malware, viruses, ransomware or any other type of attack on a solid state drive supporting NVMe protocol or AHCI protocol. Embodiments can use any number of implementations and interfaces to the hardware being monitored, for example any targeting protocol such as NVMe-oF protocol that is related to storage such as storage used in systems like SaaS systems.

In many of the embodiments, protocol targeting for NVme and AHCI is used but varieties may also be used alone or in conjunction with other protocols. For example, the NVMeOF (MVMe over Fabric) could be used in conjunction with the AI core. These protocols can also be used to monitor activities as well as train the embodiments to recognize abnormal activities with any types of protocols. Some of these described embodiments would utilize further software integration.

In many of these embodiments, a number of different threats can be monitored as well as any unusual activities related to the hardware such as certain patterns of usage or patterns indicating the storage is being partially or completely duplicated. For example, a higher amount of usage compared to a normal usage may indicate an improper activity related to the storage device.

Figure 1:
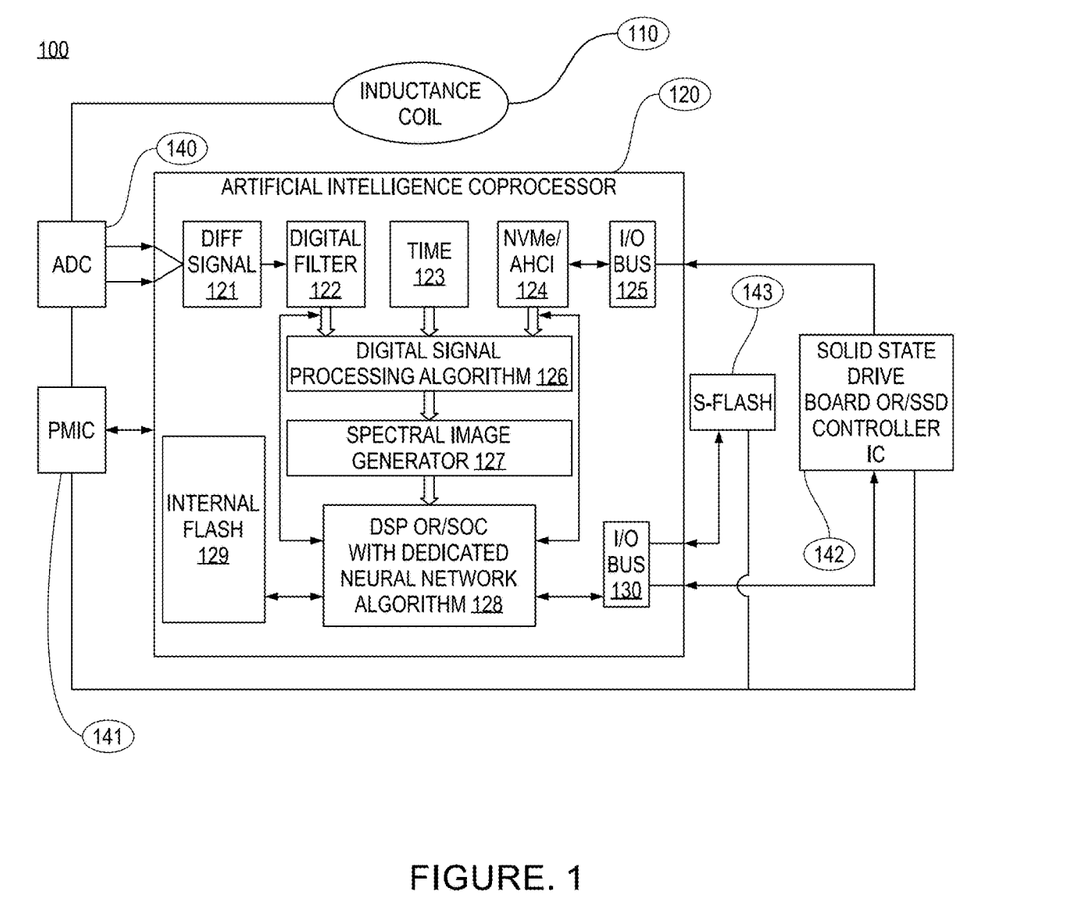
FIG. 1 illustrates a block diagram schematic that shows the modules of an AI-Coprocessor with external integrated circuit blocks showing a ransomware detector running in conjunction with a Solid State Drive with NVMe Protocol or AHCI protocol according to embodiments of the claimed subject matter.

Turning now to the figures, FIG. 1 illustrates a block diagram of an exemplary hardware system 100 based in an AI-Coprocessor Chipset for detecting ransomware involving a solid state drive controller utilizing the electromotive force energy generated by the solid state drive chipset during the running time in correspondence with an NVMe protocol or with an AHCI protocol. The hardware system 100 includes an AI-Coprocessor Chipset 120 interfaced in the same printed circuit through a predefined communication bus with a Solid State Drive Board 142. During the Power-On state of the hardware system 100, power is provided by an PMIC 141 integrated circuit with the power output value able to be configured by the AI-Coprocessor 120 if desired.

After the power status is indicated as valid, the hardware system 100 starts sampling electromotive force energy generated by the Solid State Drive Board 142 or the Solid state Driver controller 142 using a small inductance coil 110. Other embodiments may use a larger or smaller inductance coil or another data gathering component known to those skilled in the art. In these embodiments, the AI coprocessor handles recognizing activities or threats by extracting attributes in the measured data. Embodiments using the AI coprocessor will decrease any latency delay when analyzing the captured data but other embodiments using a non AI coprocessor may also be used to analyze the captured data.

The inductor or inductance coil could be a thin form factor, for example in use with a M.2 SSD format, or it could be any other suitable size. For example, in some installations such as a datacenter with limited space within each server housing or when placed in use with a laptop/notebook device, a smaller or thinner form factor can be used. Some of these embodiments can be placed in proximity to a M.2 PCB utilizing any available space inside the housing, for instance in a laptop casing having a 1.35 mm thickness (the gap between Motherboard and M.2 PCB), a thin inductor placed in proximity to the storage device may be used.

In this embodiment, the energy crossing the inductance coil 110 is sampled by the Analog-to-Digital Converter 140 and the sampled value is passed to the AI-Coprocessor Chipset 120 through one or more differential signals. The data buffer of the Analog-to-Digital Converter 140 is held temporarily in the DIFF-SIGNAL 121 dedicated register and passed to the dedicated Digital filter 122 for further processing against comparisons of unwanted signals. In many embodiments, the filtering of unwanted signals is achieved with one or more software algorithms that each may depend on one or more user predefined settings as well as one or more calibrations and thus, the embodiments may not be limited to single state machine. In some embodiments, a single AI-Coprocessor Chipset may be used but in other embodiments, a single or multiple AI-Coprocessor Chipsets could be used in conjunction with one or more cores in parallel or in serial arrangement within some working together to process captured data.

A hardware TIMER module 123 logs the one or more time periods of the digital filter 122. The NVMe/AHCI module 124 logs all commands of the NVMe protocol or the AHCI protocol which have been executed through the I/O Bus module 125 programmed with an SPI protocol or/I2C or any high speed communication control, in conjunction with the Solid State Drive Board 142 or a Solid State Driver Controller IC 142.

After a pre-defined period of data sampling from all three of the modules (the DIGITAL FILTER 122, the TIME 123 and the NVMe/AHCI 124) with all the data from those modules being transferred through internal bus data within the AI-Coprocessor 120 to a DIGITAL SIGNAL PROCESSING ALGORITHM 126 for further transformation including applying one or more different calculations depending on how the sequences are configured by the user. The results of the one or more calculations, for example buffer frames generated by the DIGITAL SIGNAL PROCESSING ALGORITHM 126, are communicated to the Spectral Image generator 127 module, and the generated image will be matched by a DSP or/SoC with Neural network algorithm 128 against a self-trained image pattern inside the internal Flash 129.

If no match, partial match, or other solution results show a potential ransomware threat, the external Secure-Flash 143 Integrated Circuit in queried. If a ransomware state pattern is detected, for example using the DSP or/SoC with Neural network algorithm 128, the system will interrupt the security alert Output Pin of the I/O Bus 130 to the Solid State Drive Board 142 or/Solid State Driver Controller IC 142. When the security events cause an interruption, the State Drive Board 142 or/Solid State Driver Controller IC 142 can take further one or more further actions depending on one or more predefined configurations installed by the user and/or the manufacturer. An interruption of the system can be accomplished any number of ways known to those skilled in the art, for example with the use of a physical bus line if the AI Coprocessor is placed within the an IC, or by a firmware code if the AI Coprocessor is integrated with the SSD controller in which the interrupt could be accomplished by writing a predefined register inside the chipset. In other embodiments, a proprietary SSD IC controller used by an OEM factory could be configured through at least one I/O connection bus to share activities and exchange attributes collected from the SSD controller including attributes such: EMF values versus time. Other embodiments can use a Diewafe solution (ASIC HW IP) in which the Ai core could be converted from RTL to GDS format. Yet other embodiments could be implemented within one or more parallel cores by software implementation.

In some embodiments, further steps or actions may include limiting access to the stored data, communicating one or more alerts such as sending one or more alert beams through an external wireless connection or a wired connection or both, locking the storage device or a component within the storage device or a component external to the storage device, and/or allowing read only mode without the ability to overwrite any stored data.

In many of the embodiments, self-training may be used to allow the AI-Coprocessor Chipsets to learn what is normal and what is abnormal. In one example, the AI-Coprocessor Chipset uses a dataset for reference against other datasets utilizing one or more levels of tolerance in the one or more comparisons. In one exemplary self-training embodiment, a normal operation threshold setup uses digital values of one or more predefined attributes. In some embodiments, the artificial intelligence algorithm running in the AI-Coprocessor Chipset compares the current operation dataset to the normal or baseline operation dataset while at the same time uses the currently incoming datasets to update or modify the dataset in use without needing external input values.

Figure 2:
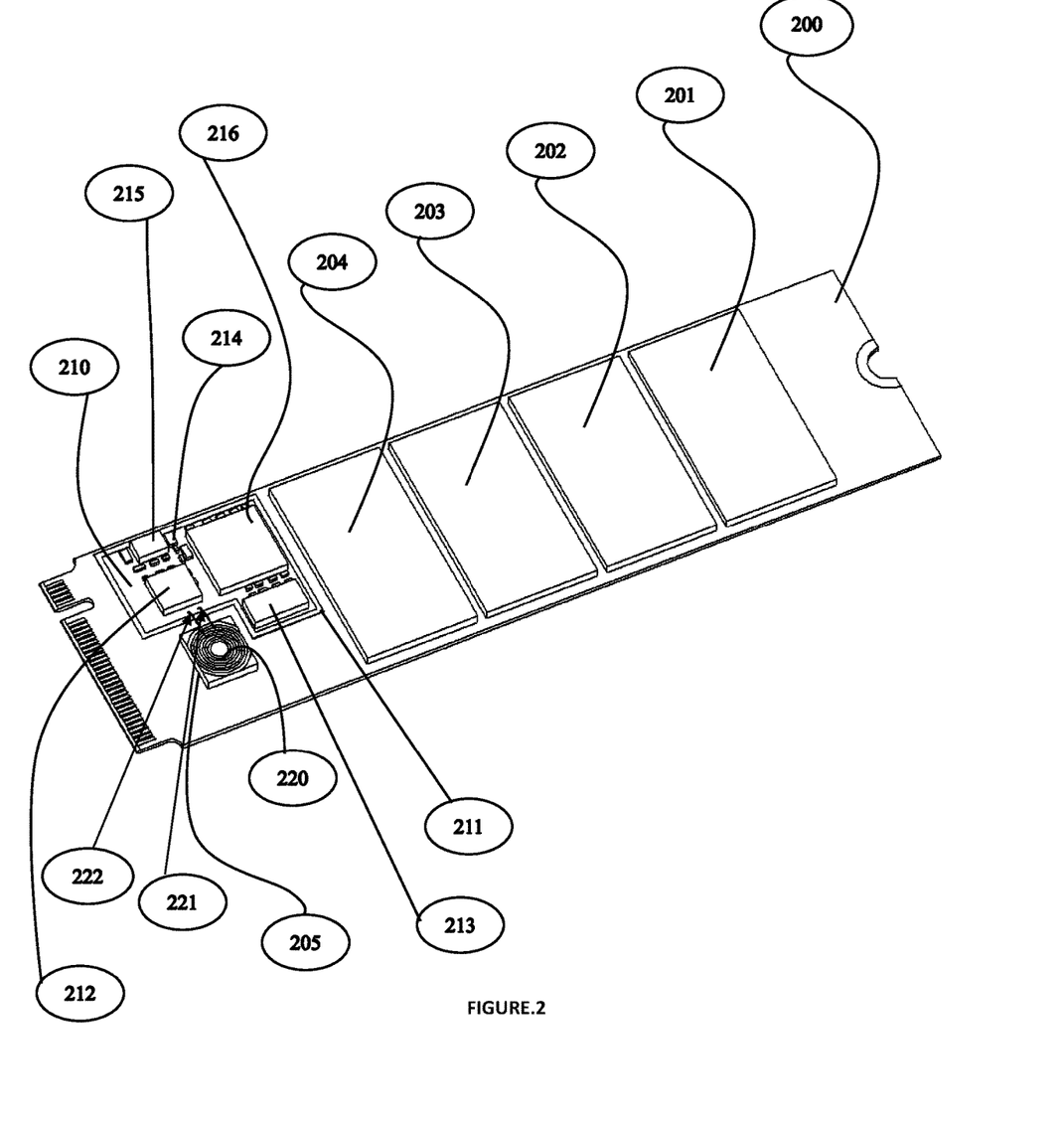
FIG. 2 illustrates three dimensional views of solid state drive with a form factor of a M.2 modular card integrated in a printed circuit board according to embodiments of the claimed subject matter.

FIG. 2 illustrates three dimensional view of a Solid State Drive with form factor of a M.2 modular card. This embodiment is integrated in the same printed circuit board 200. NAND flash modules 201, 202, 203 and 204 are placed in series and have direct connections with the Solid State Drive controller I 205. Additionally, this embodiment is placed within boundary guard trace 211 allowing the AI-Coprocessor 216 to be protected against unintentional signals and isolating the incoming sensitive signals from other high speed signals that may interfere with the embodiment. An inductance coil 220 placed on the top of the Solid State Driver Controller 205 captures generated electromotive force energy which is linked to the Analog-to-Digital Converter 212 by 2 differential signals wires 221 and 222. The inductance coil 220 may be placed in any location in proximity to the Solid State Driver Controller 205 wherein readings can be made.

In this embodiment, during the ransomware detection process, an external secure Flash 213 is used as a database for ransomware pattern data. Any other storage medium known to those skilled in the art may also be used. All components within the area boundary 210 are powered by a dedicated Power Management Unit 215 together in conjunction with the passive components 214. These embodiments illustrate an example of one hardware solution for the ransomware detector configuration that can be used to protect any type of M.2 modular card. Other configurations known to those skilled in the art that achieve the same results with different components can also be used such as any standard storage device layout format for example M.2.

Figure 3:
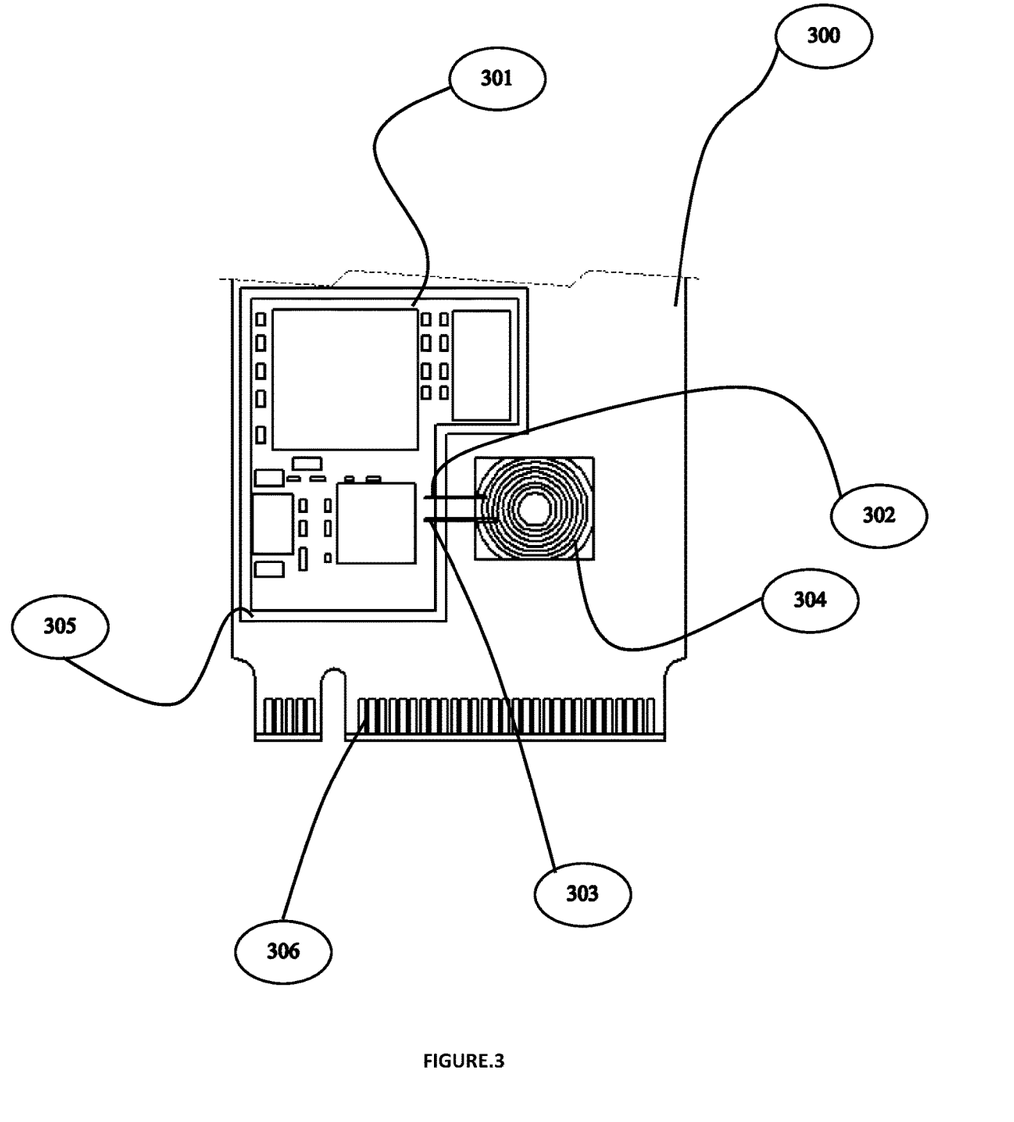
FIG. 3 illustrates atop broken down view of a modular M.2 card with a solid state drive controller integrated with an AI-Coprocessor ransomware detector configured as a hardware solution according to embodiments of the claimed subject matter.

FIG. 3. illustrates a top broken out view of a modular M.2 card 300 with a solid state drive controller integrated with an AI-Coprocessor ransomware detector configured as a hardware solution according to embodiments of the claimed subject matter. The embodiment is placed in area 301 and protected by guard trace boundary 305. The inductance coil 304 is a flexible Printed Circuit Board used to capture electromotive force energy and inductance coil 304 is connected within area 301 through pair of signal wires. In this embodiment, the first wire is positive signal 302 and second wire is negative signal 303. Also in this embodiment, the components are placed very close to PCIe power pads trace 306 in order to reduce power noise.

Figure 4:
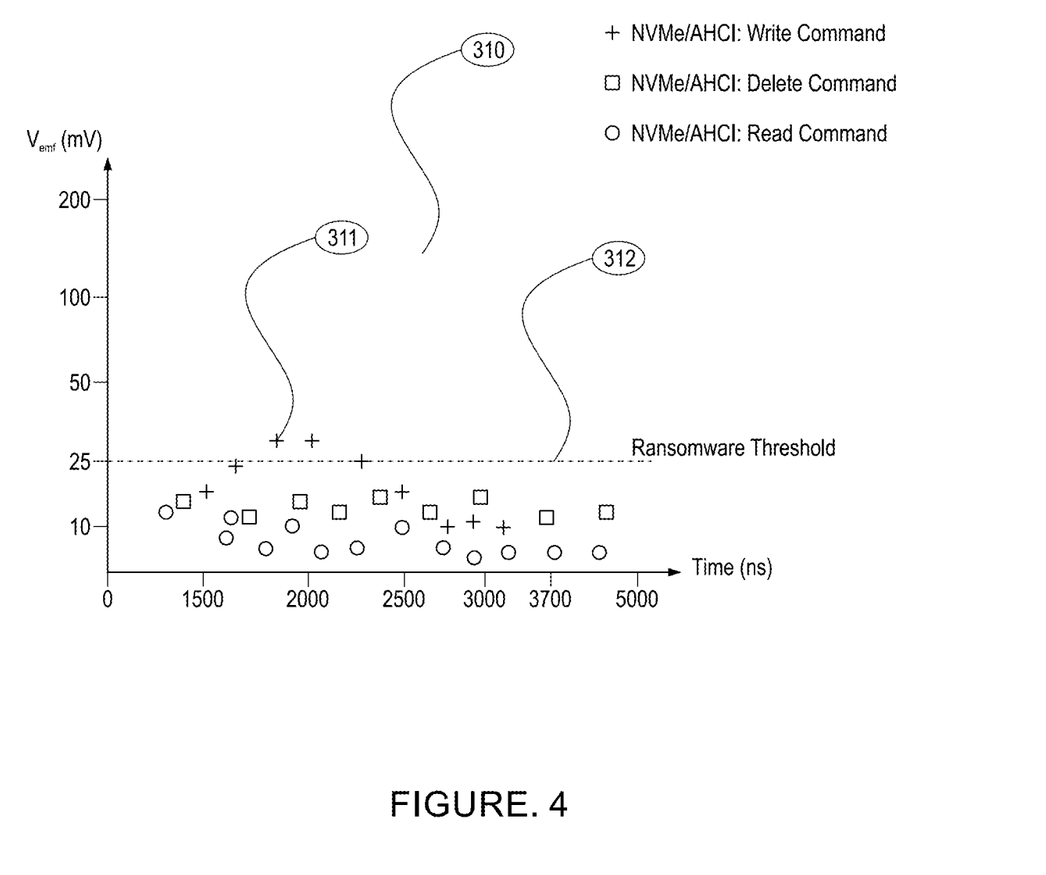
FIG. 4 illustrates a correlation of NVMe/AHCI commands against measured Vemf linearly with the time according to embodiments of the claimed subject matter.

FIG. 4 illustrates the correlation of NVMe/AHCI commands against measured Vemf linearly with the time as shown in graph 310. The points in the graph 310 represent a group of bytes sampled within a time period of 5 milliseconds wherein an NVMe/AHCI Write command 311 is executed consecutively which leads to the Solid State Controller Chipset overloading more current flows. This configuration causes an increase in the electromotive force energy that can surpass the threshold of the ransomware detect value which is shown in the graph 310 by the dashed line 312. This graph 310 illustrates one example of a precomputed method used to detect ransomware. The aforementioned time period may be a wide range, for example a nanosecond to one second, depending on the needs of the user and/or manufacture, for example a time period optimized for a specific SSD controller, storage device or other hardware component.

Figure 5A:
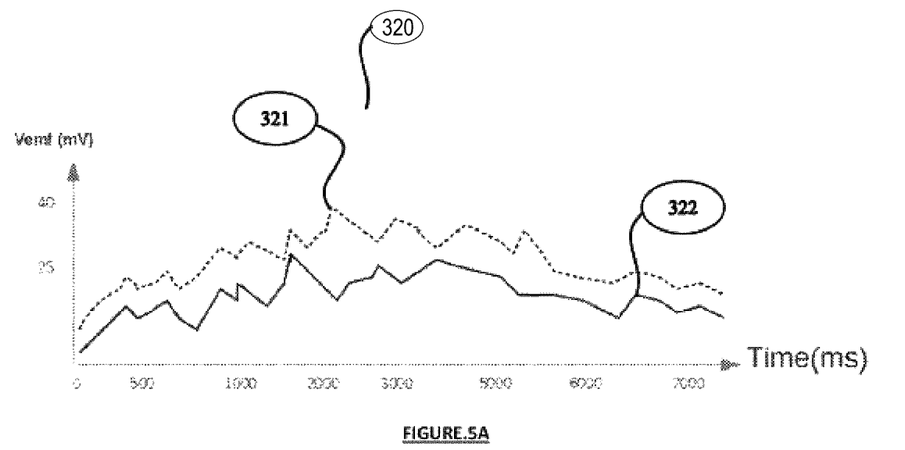
FIG. 5A illustrates an exemplary voltage level of electromotive force energy with an anomaly such as a ransomware present and with a normal operation mode linear to time according to embodiments of the claimed subject matter.

FIG. 5A illustrates an exemplary voltage level of electromotive force energy with an anomaly such as a ransomware presence and with a normal operation mode linear to time shown in the graph 320. As seen, the anomaly such as one caused by ransomware runs slightly different from the normal operation of the NVMe/AHCI. During this process, the electromotive force energy causes the solid state drive chipset to execute more instructions, and this increase in instructions leads to the increase of current flowing along integrated circuit signal. The slight difference of this anomaly (in this instance caused by the presence of ransomware) captured is shown with the dashed line 321. The graph 320 shows that greater electromotive force energy is generated compared to that generated during the normal operation of NVMe/AHCI executed commands. This difference shows the value of using electromotive force energy to identify anomalies.

Figure 5B:
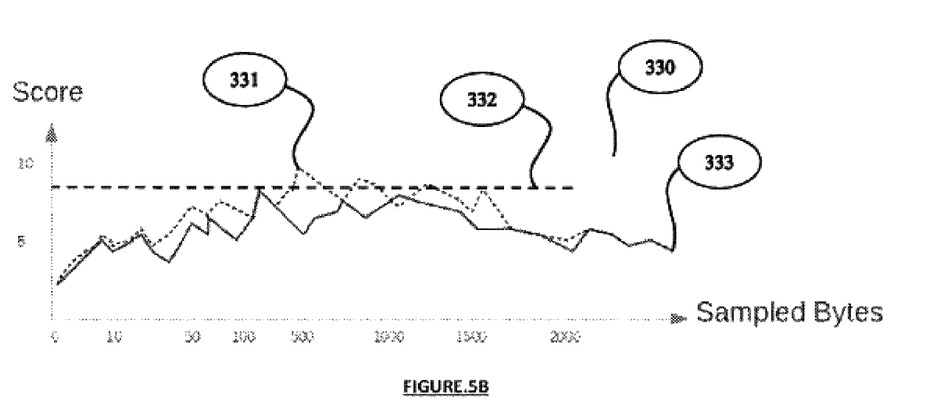
FIG. 5B illustrates a cross-correlation of a sampled bytes of NVMe/AHCI buffered command with ransomware or an exemplary anomaly detected according to embodiments of the claimed subject matter.

FIG. 5B illustrates a cross-correlation of a sampled bytes of NVMe/AHCI buffered commands with ransomware or an exemplary anomaly detected according to embodiments of the claimed subject matter and more specifically it shows a cross-correlation of a sampled bytes of NVMe/AHCI buffered command with ransomware or other anomaly detected in the graph 330. The measured value of an anomaly (such as ransomware activity) is shown in dashed line 331 and this measured value has a positive correlation with the measured value of NVMe/AHCI commands present during normal operations shown in line 333. This type of analysis can help avoid false positives such as those due to erase/wipe commands of NVMe/AHCI occurring in normal operations that could otherwise cause a fault alert of the presence of an anomaly such as ransomware. By setting the threshold score between 9 and 10 in graph 330, the peak anomaly or/ransomware can be detected when it exceeds the threshold value presented as dashed line 332 allowing the anomaly such as ransomware to be detected in an early stage before it is allowed to destroys files or do other types of damage.

Figure 6:
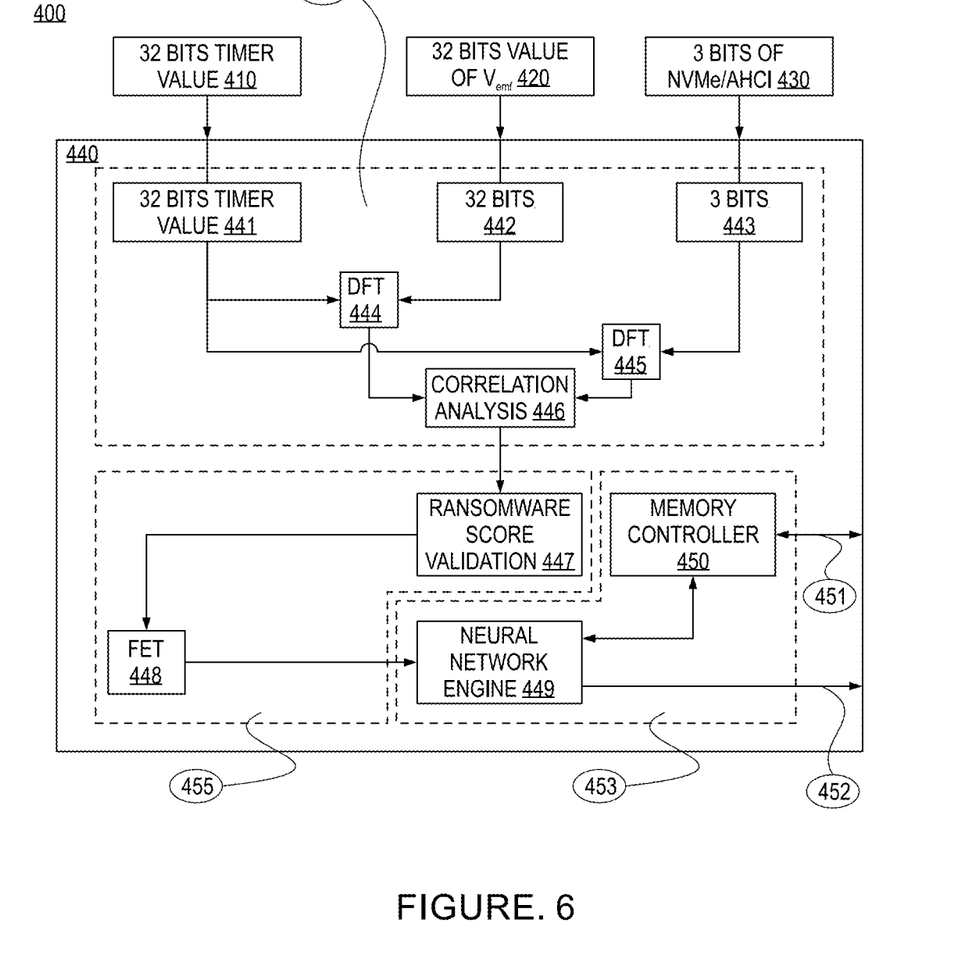
FIG. 6 illustrates a system of the AI-Coprocessor interconnections according to embodiments of the claimed subject matter.

FIG. 6 illustrates a system of the AI-Coprocessor unit interconnections according to embodiments of the claimed subject matter. In these embodiments, three external variables are used for further digital computing. These variables are the NVMe/AHCI variable 430 three bits, where MSB presents NVMe/AHCI Write command, the second bit presents the Read command and the LSB presents the ERASE/Delete command. A value of 0 or 1 is presented when one of the commands is captured in the corresponding bit location. Secondly, the measured electromotive force energy values 420 is presented in thirty-two bits and finally the timer value 410 is also presented in thirty-two bits. These external values are temporarily held in buffer registers: the NVMe/AHCI three-bit register 443, the voltage value of electromotive force energy 32-bit register 442 and the timer register 441. In other embodiments, the number of variables could be more or less than three.

The sub module 454 of the AI-Coprocessor system 440 is the first module that initiates the computing of buffer values using two DFT (Discrete Fourier Transformation) engines. The correlation analysis engine 446 calculates the cross-correlation of the two signals that come from the first DFT 445 and the second DFT 444. The correlation analysis engine 446 then transfers the calculated DFT 445 and DFT 444 values together with the calculated cross-correlation dimensions values to the ransomware score validation engine 447 which is located in sub-module 455. If the score is greater than the threshold value, both values of DFT 445 and DFT 444 are transferred to the FFT (Fast Fourier Transformation) engine 448 and the resulting FFT 448 values are then by the Neural Network Engine 449 in sub-module 453 as a spectral image. This spectral image is compared against a database of anomaly or/Ransomware spectral image signatures that are preloaded, pre-calculated and/or trained by the Neural network Engine 449. In order to have access to the database, the neural network engine 449 operates a sequence of read and write commands through the memory controller 450. The specific protocol bus in bi-directional mode 451 reads the target flash memory circuit. If the Neural network engine 449 computation detects an anomaly such as ransomware leading to a match, the neural network engine 449 sends a signal alert to the targeted solid state drive controller through a bus line 452.

Tables 1 and 2 show exemplary algorithms according to embodiments of the claimed subject matter although any other suitable algorithm known to those skilled in the art may be used.

TABLE 1

Algorithms:
Convolution algorithm

1: procedure CONV_AB(a, b)
2:   c ← (60 × 1) zero vector
3:   for h ← 1, 60 do
4:     $h^{-1}$ ← invA5(h)
5:     for g ← 1, 60 do
6:       k ← opA5(g, $h^{-1}$)
7:       c(g) ← c(g) + a(k) · b(h)
8:     end for
9:   end for
10:  return c
11: end procedure

TABLE 2

Decision tree algorithm:

INPUT: S, where S = set of classified instances
OUTPUT: Decision Tree
Require: S ≠ ∅, num_attributes > 0
1: procedure BUILDTREE
2:   repeat
3:     maxGain ← 0
4:     splitA ← null
5:     e ← Entropy(Attributes)
6:     for all Attributes a in S do
7:       gain ← InformationGain(a, e)
8:       if gain > maxGain then
9:         maxGain ← gain
10:        splitA ← a
11:      end if
12:    end for
13:    Partition(S, splitA)
14:  until all partitions processed
15: end procedure In some embodiments, the platforms, systems, media, and methods described herein include a digital processing device, or use of the same type of device. In many embodiments, the digital processing device includes one or more hardware central processing units (CPUs) or general purpose graphics processing units (GPGPUs) that carry out the function of the device or devices. In some embodiments, the digital processing device further comprises an operating system configured to perform executable instructions. In many embodiments, the digital processing device is optionally connected to a computer network. In further embodiments, the digital processing device is optionally connected to a network such as the internet which gives it the ability to reach servers located on the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, internet appliances, mobile smartphones, tablet computers, personal digital assistants, video game consoles, and vehicles.

Those of skill in the art will recognize that many smartphones are suitable for use in the system described herein. Those of skill in the art will also recognize that select televisions, video players, and digital music players with optional computer network connectivity are suitable for use in the embodiments described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In many embodiments, the platforms, systems, media, and methods disclosed herein include at least one computer program, and/or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program according to the described embodiments may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations including programs embedded or located in hardware. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Some embodiments include a relational database management system (RDBMS). Examples of suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. Those skilled in the art will recognize that there are a large number of hardware and software configurations are available to achieve the results of the embodiments without departing from the scope of the claimed subject matter.

In some embodiments, a computer program used with the describe embodiments includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™ Visual Basic, and VB .NET, or combinations thereof. Compilation is often performed, at least in part, to create an executable program. In some embodiments, a computer program includes one or more executable compiled applications. These applications or programs may be used with various embodiments of the claimed subject matter.

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in any number of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the platforms, systems, media, and methods disclosed herein include one or more databases, or use of the same. In view of the disclosure provided herein, those of skill in the art will recognize that many databases are suitable for storage and retrieval of content and related information such as one or more recordings and indexes of the one or more recordings. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices including SSD devices.

What is claimed is:

1. A computer implemented system for performing electromotive force analysis of a storage device comprising:
   a storage device configured to execute a predefined protocol;
   an AI Co-processor chipset;
   a thin coil inductor positioned in proximity to a portion of the surface of the storage device for capturing data associated to electromotive force energy generated by the storage device;
   an analog-to-digital-converter; and
   at least one probe for communicating the captured data to an analog-to-digital converter;
   wherein the data is captured by the thin coil inductor and communicated to the analog-to-digital-converter via the at least one probe;
   wherein the analog-to-digital-converter digitizes the voltage level of the captured data and communicates the results of the digitization and amplification to the AI-Coprocessor chipset;
   wherein the AI-Coprocessor chipset performs analysis of the data to detect any anomalies in the operation of the storage device and outputs those result for further processing; and
   wherein, to perform analysis of the data for the detection of anomalies, the AI-Coprocessor chipset is configured to calculate a cross-correlation between a command variable associated with the predefined protocol and the electromotive force energy generated by the storage device.

2. The computer implemented system for performing electromotive force analysis of a storage device of claim 1 wherein the storage device is a solid state drive.

3. The computer implemented system for performing electromotive force analysis of a storage device of claim 2 further comprising:
   a solid state drive controller; and
   a circuit chipset in communication with the solid state drive controller;
   wherein the solid state drive controller monitors hardware performance of the solid state drive by measuring electromotive force of the solid state drive and communicates the measured electromotive force data to the AI-Coprocessor chipset.

4. The computer implemented system for performing electromotive force analysis of a storage device of claim 3 wherein the AI-Coprocessor chipset performs analysis to provide real time protection against any anomalies in the operation of the solid state drive.

5. The computer implemented system for performing electromotive force analysis of a storage device of claim 4 wherein the predefined protocol is NVMe protocol.

6. The computer implemented system for performing electromotive force analysis of a storage device of claim 4 wherein the predefined protocol is AHCI protocol.

7. The computer implemented system for performing electromotive force analysis of a storage device of claim 4 wherein the anomaly activities are caused by malware and wherein the further processing interrupts the operation of the solid state drive.

8. The computer implemented system for performing electromotive force analysis of a storage device of claim 4 wherein the AI-CoProcessor chipset applies artificial intelligence algorithms to detect ransomware activities.

9. The computer implemented system for performing electromotive force analysis of a storage device of claim 8 wherein when the ransomware activities are detected, the operation of the solid state drive is interrupted.

10. A computer implemented method for performing electromotive force analysis of a storage device comprising the steps of:
   capturing data associated to electromotive force energy generated by a storage device using a thin coil inductor positioned in proximity to a portion of a surface of the storage device, the storage device executing a predefined protocol;
   communicating the captured data to an analog-to-digital-converter via at least one probe;
   digitizing the voltage level of the captured data using the analog-to-digital-converter;
   communicating the voltage level to an AI-Coprocessor chipset;

analyzing the voltage level using the AI-Coprocessor chipset to detect any anomalies in the operation of the storage device; and outputting the result for further processing, wherein analyzing the voltage level for the detection of anomalies comprises calculating a cross-correlation between a command variable associated with the pre-defined protocol and the electromotive force energy generated by the storage device.

11. The computer implemented method for performing electromotive force analysis of a storage device of claim 10 wherein the storage device is a solid state drive.

12. The computer implemented method for performing electromotive force analysis of a storage device of claim 11 further comprising the steps of:

monitoring the hardware performance of the solid state drive by measuring electromotive force of the solid state drive with a solid state drive controller and a circuit chipset in communication with the solid state drive controller;

communicating the measured electromotive force data to the AI-Coprocessor chipset;

using the Al-Coprocessor chipset to analyze the measured electromotive force data; and outputting the results of the analysis to provide real time protection against any anomalies in the operation of the solid state drive.

13. The computer implemented method for performing electromotive force analysis of a storage device of claim 12 wherein the AI-Coprocessor chipset performs analysis to provide real time protection against any anomalies in the operation of the solid state drive.

14. The computer implemented method for performing electromotive force analysis of a storage device of claim 11 wherein the predefined protocol is NVMe protocol.

15. The computer implemented method for performing electromotive force analysis of a storage device of claim 11 wherein the predefined protocol is AHCI protocol.

16. The computer implemented method for performing electromotive force analysis of a storage device of claim 11 wherein the anomaly activities are caused by malware and further comprising the step of:

interrupting the operation of the solid state drive when an anomaly caused by malware is detected.

17. The computer implemented method for performing electromotive force analysis of a storage device of claim 12 wherein the AI-Coprocessor chipset utilizes artificial intelligence algorithms to detect ransomware activities.

18. The computer implemented method for performing electromotive force analysis of a storage device of claim 17 further comprising the step of:

interrupting the operation of the solid state drive when the ransomware activities are detected by the Al-Coprocessor chipset.

19. The computer implemented system for performing electromotive force analysis of a storage device of claim 1, wherein the AI Co-processor chipset is configured to perform the steps of limiting access to stored data, sending one or more alert beams through an external wireless connection or a wired connection or both, locking the storage device or a component within the storage device or a component external to the storage device, and/or allowing read only mode without the ability to overwrite any stored data.

20. The computer implemented method for performing electromotive force analysis of a storage device of claim 10, further comprising the steps of limiting access to stored data, sending one or more alert beams through an external wireless connection or a wired connection or both, locking the storage device or a component within the storage device or a component external to the storage device, and/or allowing read only mode without the ability to overwrite any stored data.

* * * * *